ns*

United States Patent [19]

Hoffer

[11] 3,899,482

[45] Aug. 12, 1975

[54] 2,2'-ANHYDRO-1-β-D-ARABINOFURANO-SYL-5-FLUOROCYTOSINE SALTS AND PROCESS

[75] Inventor: Max Hoffer, Nutley, N.J.

[73] Assignee: Hoffmann-La Roche Inc., Nutley, N.J.

[22] Filed: Sept. 5, 1972

[21] Appl. No.: 286,491

[52] U.S. Cl. .......................... 260/211.5 R; 424/180
[51] Int. Cl.² ........................................ C07H 19/06
[58] Field of Search .............................. 260/211.5 R

[56] References Cited
UNITED STATES PATENTS

| | | | |
|---|---|---|---|
| 3,463,850 | 8/1969 | Shen et al. | 260/211.5 R |
| 3,709,874 | 1/1973 | Moffatt et al. | 260/211.5 R |
| 3,755,296 | 8/1973 | Kanai et al. | 260/211.5 R |

*Primary Examiner*—Johnnie R. Brown
*Attorney, Agent, or Firm*—Samuel L. Welt; Jon S. Saxe; George M. Gould

[57] ABSTRACT

Reaction of 5-fluorocytidine with the Vilsmeier-Haack reagent followed by treatment of the reaction mixture with water or a lower alkanol directly yields the previously unknown hydrohalide salts of 2,2'-anhydro-1-β-D-arabinofuranosyl-5-fluorocytosine as crystalline solids. These compounds are useful as orally or parenterally active immunorepressive or anti-neoplastic agents and as intermediates in the preparation of other acid addition salts, such as the formate of the base compound.

5 Claims, No Drawings

2,2-ANHYDRO-1-β-ARABINOFURANOSYL-5-FLUOROCYTOSINE SALTS AND PROCESS

BACKGROUND OF THE INVENTION

The compound 1-β-D-arabinofuranosylcytosine (ara-C) hydrochloride has been known to have antitumor activity for over a decade now (Evans et al., Proc. Soc. Exp. Biol. Med., 106; 350–353, 1961). Its fluorinated analog 1-β-D-arabinofuranosyl-5-fluoro-cytosine (ara-FC) has also been shown to be an active anti-cancer agent, particularly with respect to transplanted mouse leukemias (Fox et al., J. Med. Chem., 9: 101–105, 1966).

More recently, Hoshi et al. (GANN 62: 145–146, 1971) have reported that 2,2'-anhydro-1-'-D-arabinofuranosyl-cytosine (2,2'-anhydro-ara-C or 2,2'-0-cyclocytidine) at high dose levels is markedly active against mouse leukemia L1210.

In West German Patent 2112724 a series of 3'-0-acyl-5-halo-2,2'-cyclocytidine hydrohalides are described including the 5-fluoro compounds.

Finally, Fox et al. at the Sloan-Kettering Institute for Cancer Research have prepared 2,2'-anhydro-1-β-D-arabinofuranosyl-5-fluorocytosine (2,2'-anhydro-ara-FC) as the formate salt and have demonstrated its activity against several mouse leukemias by intravenous and oral administration. The 2,2'-anhydro-ara-FC was prepared via 5-fluorocytidine from 5-fluorocytosine and tri-0-benzoyl-D-ribofuranosyl chloride employing the procedure of Kikugawa et al., J. Org. Chem. 37: 284–288, 1972 which involves utilizing the Vilsmeier-Haack reagent on the 5-fluorocytidine intermediate. Kikugawa et al. in the aforesaid paper describe the preparation of 2,2'-anhydro-1-β-D-arabinofuranosylcytosine hydrochloride from the corresponding formate salt. Isolation of the formate from the reaction mixture in both instances required an extensive work-up involving ion-exchange chromatography with large amounts of solvents followed by repeated evaporations of highly dilute solutions and recrystallizations from ethanol.

DESCRIPTION OF THE INVENTION

The present invention relates to the new hydrohalide salts of 2,2'-anhydro-1-β-D-arabinofuranosyl-5-fluorocytosine (2,2'-anhydro-ara-FC) and to processes for their preparation. The compounds of the present invention are useful as orally or parenterally active immunorepressive, or anti-neoplastic agents or as intermediates in the preparation of other acid addition salts of the aforesaid base compound.

As indicated above, the preparation of 2,2'-anhydro-ara-FC by prior methods was inefficient in that ion-exchange chromatography and extensive trituration, evaporations and recrystallizations were required in order to obtain the corresponding formate salt in crystalline form.

It has now been found that it is possible to obtain the new hydrohalide salts of 2,2'-anhydro-ara-FC in crystalline form directly from the reaction mixture by treating such mixture with a specific amount of water or with a $C_1$–$C_7$ lower alkanol. In this manner the time, solvents and equipment required in the process for preparing 2,2'-anhydro-ara-FC are substantially reduced, thus resulting in an extremely more efficient and economic process.

As used herein the term hydrohalide is meant to include hydrobromide, hydrofluoride and hydrochloride. The preferred hydrohalide is the hydrochloride. The term $C_1$–$C_7$ lower alkanol is meant to include branched or straight chain alkanols having from one to seven carbon atoms including for example, methanol, ethanol, n-propanol, i-propanol t-butanol, n-hexanol and the like. Preferred lower alkanols have one to four carbon atoms. Methonol represents a most preferred lower alkanol.

Preparation of the hydrohalide salts of 2,2'-anhydro-ara-FC of the present invention can be conveniently carried out by reaction of 5-fluoro-cytidine with the Vilsmeier-Haack reagents. These reagents are formed by combining N,N'-dimethylformamide with an appropriate acid halide. Suitable acid halides include, for example, thionyl bromide, thionyl fluoride, thionyl chloride, phosphorous oxychloride, phosphorous oxybromide and phosphorous oxyfluoride. The details of the preparation of the Vilsmeier-Haack reagents are contained in the paper by Kikugawa et al. cited previously above.

The aforesaid reaction is conducted at a temperature in the range of from about −10° to about 80° C., most preferably in the range of from about +10° to 40°C. If desired, solvents may be employed in the reaction mixture. Suitable solvents include an excess of the N,N'-dimethylformamide, organic ketones such as methyl ethyl ketone, nitriles such as acetonitrile, halogenated hydrocarbons such as chloroform, esters such as ethyl acetate and the like. Solvents that react with the Vilsmeier-Haack reagents including water and alcohols should not be utilized during the reaction.

It is evident that selection of the acid halide above will determine the nature of the product 2,2'-anhydro-ara-FC hydrohalide formed. Thus, use of phosphorous oxychloride for example, will yield the 2,2'-anhydro-ara-FC hydrochloride.

The Vilsmeier-Haack reagent is utilized in an amount within the range of from about 3 mol to about 6 mol per mol of 5-fluoro-cytidine. Use of this proportion of reagents is important to the successful isolation of the product hydrohalide salt from the reaction mixture in crystalline form.

After completion of the addition of the reagents the reaction mixture is allowed to stand at a temperature in the range of from about 15° to 30°C. for a period of from 1 hour to 72 hours. At this point in time an intermediate compound having a U.V. absorption maximum of 325 nm may be observed in the reaction mixture.

Addition of from 20 to 100 ml of water per equivalent weight of acid halide employed (an amount which is sufficient to transform the above intermediates and decompose the excess Vilsmeier-Haack reagent) with cooling to prevent the temperature from rising above about 40°C. will produce crystallization of 2,2'-anhydro-ara-FC hydrohalide. Similarly, crystallization of the desired product can be induced by adding from 60 to 500 ml. of a $C_1$–$C_7$ lower alkanol per equivalent weight of acid halide to the reaction mixture.

The 2,2'-anhydro-ara-FC-hydrohalides produced above may be readily convertible to the corresponding formate and other pharmaceutically acceptable acid addition salts by ion exchange procedures well known in the art. For example, the hydrohalide may be dissolved in an excess of water and chromatographed through an ion exchange resin column such as Dowex 50 W in the hydrogen form followed by elution with 3% aqueous formic acid.

The compounds of the present invention, i.e., 2,2'-anhydro-ara-FC-hydrohalides are therapeutically useful as orally or parenterally active immunorepressive or anti-neoplastic agents. Suitable divided daily dosage regimens for utilization of the compounds of the present invention in oral form are in the range of from about 500 to 2000 mg. Parenteral administration regimens of compounds of the present invention in divided daily dosages are in the range of from about 200 to 1500 mg. It is understood, of course, that ultimate selection of proper dosage regimens will be determined by the administrator of the drugs based upon the identity and condition of the subject and the requirement of treatment.

The 2,2'-anhydro-ara-FC hydrohalides of the present invention can be used in the form of conventional pharmaceutical preparations; for example, the aforesaid compounds may be mixed with conventional organic or inorganic inert pharmaceutical carriers suitable for parenteral or enteral administration. They can be administered in conventional pharmaceutical forms, for example, tablets, capsules, solutions, suspensions or emulsions. Moreover, the pharmaceutical composition subcontaining compounds of this invention can be subjected to conventional pharmaceutical expedients such as sterilization, and can contain conventional pharmaceutical excipients such as preservatives, stabilizing agents, wetting agents, emulsifying agents, salts for the adjustment of osmotic pressure, or buffers. The compositions can also contain other therapeutically active materials.

The chemotherapeutic activity of 2,2'-anhydro-ara-FC as the formate salt has been demonstrated by its ability to prolong the survival time of mice with transplanted leukemia utilizing the technique of Burchenal et al., Cancer 2: 113–118, 1949. In such tests daily dosages of 200–300 mg/kg of 2,2'-anhydro-ara-FC causes significant prolongation of survival time in mice innoculated with leukemia L1210 as well as with its mercaptopurine resistant variant L1210/6-MP. At approximately comparable toxic daily doses 2,2'-anhydro-ara-FC was more active than ara-C, ara-FC, anhydro-ara-C, or ara-FU. Additionally, 2,2'-anhydro-ara-FC is active with a single intraperitonial or oral dose of 1,500 mg/kg 24 to 48 hours after the innoculation of leukemic cells.

In the following examples all temperatures are in degrees Centigrade.

EXAMPLE 1

13 g. of fluorocytidine were dissolved in 100 ml. of anhydrous dimethylformamide under stirring. 100 ml. of acetonitrile were added and the mixture chilled in ice water. 50 g. of phosphorous oxychloride were dropped into the stirred and chilled solution over a period of approximately 10 to 15 minutes at temperatures below 40°. When the temperature ceased to rise the ice water bath was removed and the mixture was allowed to stand at 20°–30° for 6 hours. It was then chilled again and 25 ml. of water were dropped into the solution under stirring below 40°. When the temperature did not rise any longer, it was allowed to stand at 20°–30° for 24 hours, and the heavy crystallization, that occurred, filtered by suction, rinsed with 100 ml. of acetone and subsequently with 50 ml. of methanol and 20 ml. of ether. The yield was 8 g. (58%) of 2,2'-anhydro-1-$\beta$D-arabinofuranosyl-5-fluorocytosine hydrochloride. The product was recrystallized from 40 ml. of water. The product chars above 210° and has no distinct mp. $[\alpha]_D^{25} = -35.33$, 1% in 0.1nHCl, U.V.: two maxima at 231 and 258, saddle at 246 nm.

The starting material may be prepared as follows:

117 g. of 1-O-acetyl-2,3,5-tri-O-benzoyl-D-ribose were dissolved in 800 ml. of methylenechloride and 50 ml. of absolute ether. HCl gas was conducted into the mixture under chilling with freezing mixture and exclusion of moisture at −5° to +5° for two hours. Progress of the reaction was followed up by TLC. The solution was evaporated in vacuum from a hot water bath. The remaining syrup was dissolved in 100 ml. of toluene and the toluene evaporated in vacuo. The process was repeated with 100 ml. of toluene till the residue was substantially acid-free.

In the meantime a 5-L-three neck-flask, equipped with heating mantle, mechanical stirrer and descending condenser was charged with 4 liters of acetonitrile, 28 g. of fluorocytosine, and 112 g. of mercuric cyanide and heated in a hood under stirring while distilling off 750–1000 ml. of the solvent over a period of 2 to 3 hours. The 2,3,5-tri-0-benzoyl-D-ribofuranosyl chloride which in the meantime had become ready to be used, was dissolved in 200 ml. of acetonitrile and added to the stirred warm solution over a period of 10 to 20 minutes. A clear solution resulted almost immediately and the mixture was allowed to cool overnight. The next morning approximately 2 liters of the solvent were distilled off under stirring and the residue evaporated in vacuo with a water bath to a semi-crystalline mass. It was slurried with 800 ml. of methylene chloride, filtered from undissolved material (apparently a mercuric chloride-mercuric cyanide complex) and rinsed with 200 ml. of methylene chloride. The filtrate was stirred with 1 liter of a 15% aqueous potassium iodide solution for 15 to 30 minutes and filtered again in order to achieve a clear separation of the layers. The methylene chloride layer was separated, and washed first with 200 ml. of a 15% aqueous potassium iodide solution then with 100 ml. of the same and finally with 500 ml. of water. It was dried over 50 g. of anhydrous magnesium sulfate. The filtered solution was dropped under stirring into 2 liters of hot toluene while the methylene chloride was allowed to distill off together with some of the toluene which was replenished by fresh toluene. The product gradually precipitated first in gelatinous form, later becoming crystalline (upon seeding, if necessary). After allowing to cool it was filtered, and washed on the filter with 100 ml. of ethanol followed by 100 ml. of ether. Dried at 90°–100° to constant weight the yield was 76.9 g (58.5%) of O-tribenzoyl-5-fluorocytidine m.p. = 202°–204°. 150 g. of the product thus obtained were suspended in 1500 ml. of methanol under stirring and 25 ml. of a 1 to 1.5 normal barium methylate solution was added. The sold went into solution over a period of one-half to 1 hour and the solution was allowed to stand overnight. The barium methylate was exactly neutralized with 1N sulfuric acid in an amount that corresponds exactly to a parallel titration of 25 ml. of the barium methylate solution used. The mixture was evaporated in vacuo, the residue freed from methylbenzoate by rinsing it repeatedly with small amounts of ethylacetate, and then dissolved in 300 to 500 ml. of water. It was filtered from finely suspended barium sulfate over a layer of cellite and charcoal by suction, and the filtrate evaporated to a syrup which crystallizes upon slurrying with 2-propanol. Yield: 56.5 g. (82%), m.p. 193°–195°. of 5-fluoro-cytidine.

EXAMPLE 2

A total of 5 g. of 2,2'-anhydro-1-α-D-arabinofuranosyl-5-fluorocytosine hydrochloride was dissolved in 300 ml. of water and the solution adjusted with pyridine to a pH of 6. The solution was then chromatographed on a Dowex 50 W (hydrogen form) column, rinsed with 200 ml. of distilled water and the adsorbed product eluated with 500 ml. of 3% aqueous formic acid. The eluate was adjusted with pyridine to a pH of 3. After removal of the solvents in vacuo, the residue was recrystallized from methanol-ether to yield 2,2'-anhydro-1α-D-arabinofuranosyl-5-fluorocytosine formate identical in physical characteristics with material prepared by Fox et al.

EXAMPLE 3

A solution of 13 g of 5-fluorocytidine in 100 ml of N,N'-dimethylformamide was chilled to 0° and 30 ml of phosphorous oxychloride was dropped into the solution at a temperature maintained below 40°. After standing for 2 hours a total of 40 ml of methanol was added with chilling causing a strong evolution of methyl chloride and a rise in temperature up to 50° necessitating additional chilling. After allowing the solution to cool the product 2,2'-anhydro-1-β-D-arabinofuranosyl-5-fluorosytosine hydrochloride crystallized and was filtered after 3 to 5 hours. The total yield was 4g, U.V.:- two maxima at 226 and 268 nm and a saddle at 244 nm.

EXAMPLE 4

| Tablet Formulation | Per Tablet |
|---|---|
| 2,2'Anhydro-1-beta-D-arabinofuranosyl-5-fluorocytosine hydrochloride | 100 mg. |
| Lactose, U.S.P. | 202 mg. |
| Corn Starch, U.S.P. | 80 mg. |
| Amijel B011* | 20 mg. |
| Calcium Stearate | 8 mg. |
| Total Weight | 410 mg. |

*A prehydrolyzed food grade corn starch. Any similar prehydrolyzed corn starch may be used. Purchased from: Corn products Company, 10 East 56th Street, New York, New York PROCEDURE:
1. 2,2'-Anhydro-1-beta-D-arabinofuranosyl-5-fluorocytosine hydrochloride, lactose, corn starch, and Amijel BO11 were blended in a suitable mixer.
2. The mixture was granulated to a heavy paste with water and the moist mass was passed through a No. 12 screen. It was then dried overnight at 110°F.
3. The dried granules were passed through a No. 16 screen and transferred to a suitable mixer. The calcium stearate was added and mixed until uniform.
4. The mixture was compressed at a tablet weight of 410 mg. using tablet punches having a diameter of approximately three-eights inch. (Tablets may be either flat or biconvex and may be scored if desired.)

EXAMPLE 5

| Tablet Formulation | Per Tablet |
|---|---|
| 2,2'-Anhydro-1-beta-D-arabinofuranosyl-5-fluorocytosine hydrochloride | 500 mg. |
| Corn Starch | 30 mg. |
| Lactose | 88 mg. |
| Gelatin | 12 mg. |
| Talcum | 15 mg. |
| Magnesium Stearate | 5 mg. |
| Total Weight | 650 mg. |

PROCEDURE:
1. 2,2'-Anhydro-1-beta-D-arabinofuranosyl-5-fluorocytosine hydrochloride 20 mg. of cornstarch and lactose were thoroughly mixed in suitable blending equipment and granulated with a 10% gelatin solution.
2. The moist mass was passed through a No. 12 screen, and the granules were dried on paper-lined trays overnight.
3. The dried granules were passed through a No. 14 screen and placed in a suitable mixer. The talcum 10 mg. of corn starch and magnesium stearate were added and blended.
4. The granulation was compressed into tablets weighing approximately 650 mg. each, using punches having an approximate diameter of 12.7 mm (one-half inch). The final tablet thickness was about 5.1 mm.

EXAMPLE 6

| Tablet Formulation 250 mg. | Per Tablet |
|---|---|
| 2,2'-Anhydro-1-beta-D-arabinofuranosyl-5-fluorocytosine hydrochloride | 250 mg. |
| Dicalcium Phosphate Dihydrate, Unmilled | 235 mg. |
| Corn Starch | 70 mg. |
| FD&C Yellow No. 5 - Aluminum Lake 25% | 2 mg. |
| Durkee 117 | 25 mg. |
| Calcium Stearate | 3 mg. |
| Total Weight | 585 mg. |

PROCEDURE:
1. All the ingredients were mixed thoroughly and Fitzed (Model D) using a No. 1A screen, medium speed.
2. The mixture was remixed and slugged.
3. The slugs were screened on an Oscillator through a No. 14 mesh screen and compressed on an "E" machine.

EXAMPLE 7

| Capsule Formulation | Per Capsule |
|---|---|
| 2,2'-Anhydro-1-beta-D-arabinofuranosyl-5-fluorocytosine hydrochloride | 250 mg. |
| Lactose | 60 mg. |
| Corn Starch | 35 mg. |
| Magnesium Stearate | 5 mg. |
| Total Weight | 350 mg. |

PROCEDURE:
1. All of the ingredients were mixed until thoroughly blended in a suitable size container.
2. The powder was filled into No. 2, two-piece, hard shell gelatin capsules to an approximate fill weight

EXAMPLE 8

| Parenteral Formulation<br>Each 1 cc ampul contains: | Per cc |
|---|---|
| 2,2'-Anhydro-1-beta-D-arabinofuranosyl-5-fluorocytosine hydrochloride | 25 mg. |
| Methyl Paraben, U.S.P. | 1.8 mg. |
| Propyl Paraben, U.S.P. | 0.2 mg. |
| Hydrochloric Acid q.s. pH | 4.5 |
| Water for Injection q.s. ad | 1 cc |

PROCEDURE (For 10,000 cc):
1. In a clean glass or glass-lined vessel, 8,000 cc of Water for Injection were heated to 90°C. It was then cooled to 50°–60°C, and 18 grams of methyl paraben and 2 grams of propyl paraben were added and dissolved with stirring. The solution was then allowed to cool to room temperature.
2. The 250 grams of 2,2'-Anhydro-1-beta-D-arabinofuranosyl-5-fluorocytosine hydrochloride were added under an atmosphere of nitrogen and stirred until completely dissolved.
3. The hydrochloric acid was added as a 1N solution until the pH was adjusted to 4.5 plus or minus 0.2.
4. Sufficient Water for Injection was then added to make a total volume of 10,000 cc.
5. This solution was then filtered through an 02 Selas candle, filled into suitable size ampuls, gassed with nitrogen and sealed. It was autoclaved at 10 lbs.PSI for 30 minutes.

I claim:

1. A process for the preparation of a 2,2'-anhydro-1-beta-D-arabinofuranosyl-5-fluorocytosine hydrohalide selected from the group consisting of the hydrobromide, hydrofluoride and hydrochloride which process consists essentially of reacting 5-fluorocytidine with the Vilsmeier-Haack reagent (N,N'-dimethylformamide and an acid halide selected from the group consisting of thionyl chloride, -bromide or -fluoride and phosphorous oxychloride, -oxybromide or -oxyfluoride), said reagent being present in the concentration in the range of from about 3 to 6 mols per mol of 5-fluorocytidine and thereafter adding water or a $C_1$–$C_7$ lower alkanol in an amount not substantially exceeding the amount needed to decompose the said Vilsmeier-Haack reagent whereby said 2,2'-anhydro-1-beta-D-arabinofuranosyl-5-fluorocytosine hydrohalide is obtained in crystalline form directly from the reaction mixture.

2. The process of claim 1 wherein said reaction is conducted at a temperature in the range of from about −10° to 80°C.

3. The process of claim 1 wherein the reaction mixture is allowed to stand at a temperature in the range of from about 15° to 30°C. for a period of from 1 to 72 hours prior to addition of said water or $C_1$–$C_7$ lower alkanol.

4. The process of claim 1 wherein said Vilsmeier-Haack reagent is obtained from phosphorous oxychloride and N,N' dimethylformamide and said 2,2'anhydro-1-β-D-arabinofuranosyl-5-fluorocytosine hydrohalide is the hydrochloride.

5. The process of claim 1 wherein from 20 to 100 ml. of water per equivalent of acid halide is utilized.

* * * * *